US008457940B2

(12) United States Patent
Xi et al.

(10) Patent No.: US 8,457,940 B2
(45) Date of Patent: Jun. 4, 2013

(54) MODEL-CONSISTENT STRUCTURAL RESTORATION FOR GEOMECHANICAL AND PETROLEUM SYSTEMS MODELING

(75) Inventors: Gui Fen Xi, Bracknell (GB); Randolph E. F. Pepper, Beijing (CN); Agnes Dubois, La Ferte Saint Cyr (FR); Jimmy Klinger, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 381 days.

(21) Appl. No.: 12/846,149

(22) Filed: Jul. 29, 2010

(65) Prior Publication Data
US 2012/0029895 A1 Feb. 2, 2012

(51) Int. Cl.
*G06G 7/48* (2006.01)
(52) U.S. Cl.
USPC .................................... 703/10; 703/5
(58) Field of Classification Search
USPC ....................................... 703/5, 10
See application file for complete search history.

(56) References Cited

U.S. PATENT DOCUMENTS

| 7,043,410 | B2 | 5/2006 | Malthe-Sorenssen et al. |
| 7,177,764 | B2 | 2/2007 | Stone |
| 7,181,380 | B2 | 2/2007 | Dusterhoft et al. |
| 7,472,022 | B2 | 12/2008 | Birchwood |
| 8,150,669 | B2 | 4/2012 | Cacas et al. |
| 8,184,502 | B2 | 5/2012 | Xu et al. |
| 2002/0013687 | A1 | 1/2002 | Ortoleva |
| 2008/0183451 | A1* | 7/2008 | Weng et al. ............... 703/10 |
| 2009/0248374 | A1* | 10/2009 | Huang et al. ............. 703/2 |
| 2010/0211367 | A1 | 8/2010 | Koutsabeloulis et al. |
| 2010/0223039 | A1 | 9/2010 | Maliassov |
| 2011/0246154 | A1 | 10/2011 | Koutsabeloulis et al. |

FOREIGN PATENT DOCUMENTS

| WO | 0060379 A1 | 10/2000 |
| WO | 0175588 A1 | 10/2001 |

OTHER PUBLICATIONS

Baur, et al., "Integrating structural geology and petroleum systems modeling—A pilot project from Bolivia's fold and thrust belt", Marine and Petroleum Geology, vol. 26, Issue 4, Apr. 2009, pp. 673-679.
Koutsabeloulis, et al., "Coupled geomechanics predicts well failures", http://www.epmag.com/archives/features/764.htm, Jan. 3, 2008, 3 pages.
Kristiansen, et al., "Linking seismic response to geomechanics", Geo ExPro, vol. 6, Issue 6, 2009, XX pages.
Tran, et al., "New Iterative Coupling Between a Reservoir Simulator and a Geomechanics Module", SPE paper 88989-PA, Sep. 2004, 8 pages.
Search and Examination Report for Great Britain Application GB1105552.2 dated Jul. 21, 2011, 1 Page.
Non Final Office Action for U.S. Appl. No. 12/693,813, mailed Apr. 18, 2012, 12 pages.
Non Final Office Action for U.S. Appl. No. 12/755,114, mailed Sep. 26, 2012, 15 pages.

\* cited by examiner

*Primary Examiner* — Saif Alhija
(74) *Attorney, Agent, or Firm* — Colin Wier

(57) ABSTRACT

A method for modeling a subterranean formation of a field, including receiving a structural model and restoring geological layers thereof to create boundary conditions each associated with a corresponding geological layer, and iteratively modeling each geological layer by alternatively applying a petroleum system model (PSM) and a geomechanical model (GMM) to a first geological layer while exchanging data between the PSM and GMM for convergence prior to applying the PSM and the GMM to a second geological layer.

20 Claims, 9 Drawing Sheets

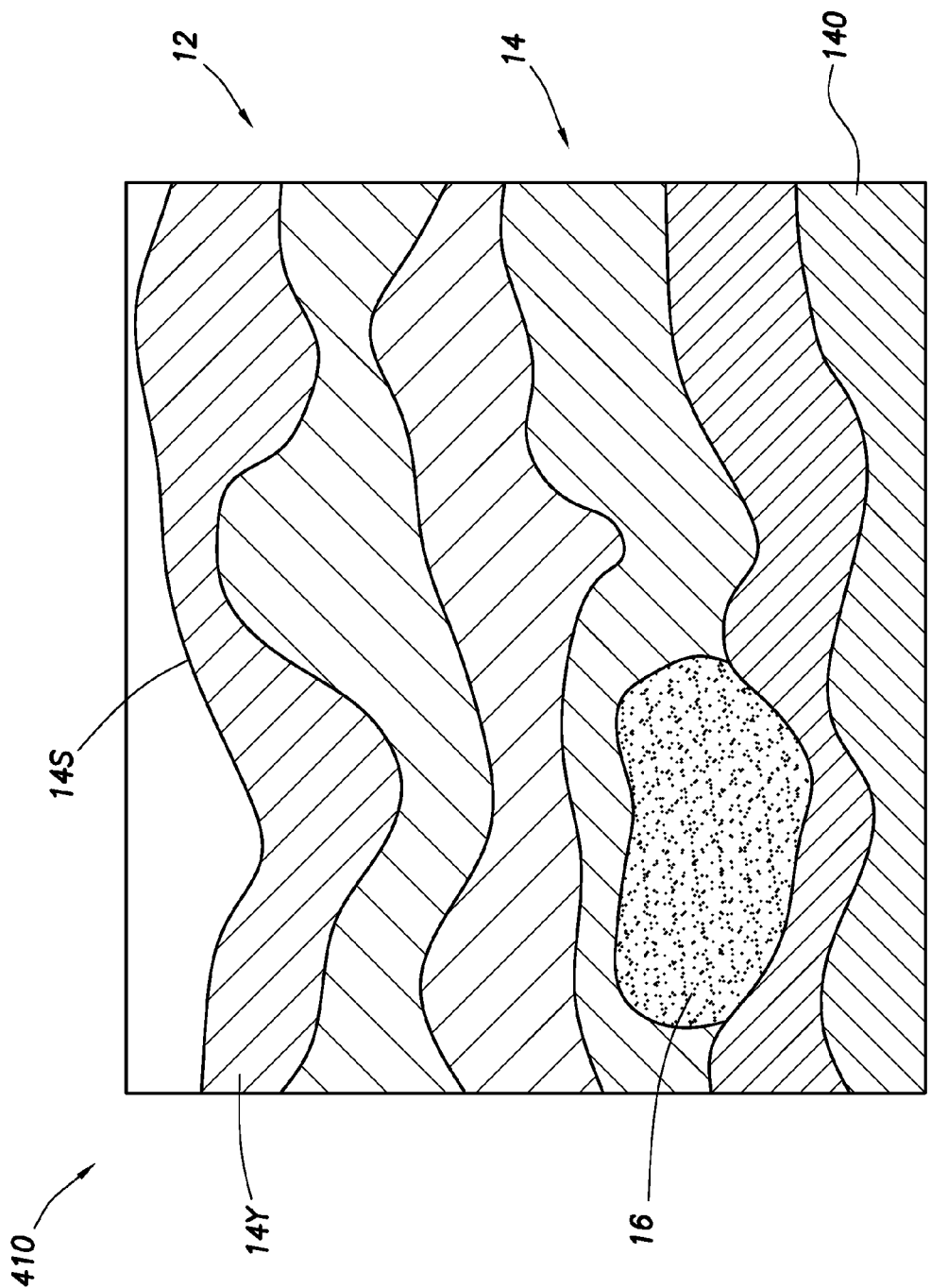
FIG.4.1

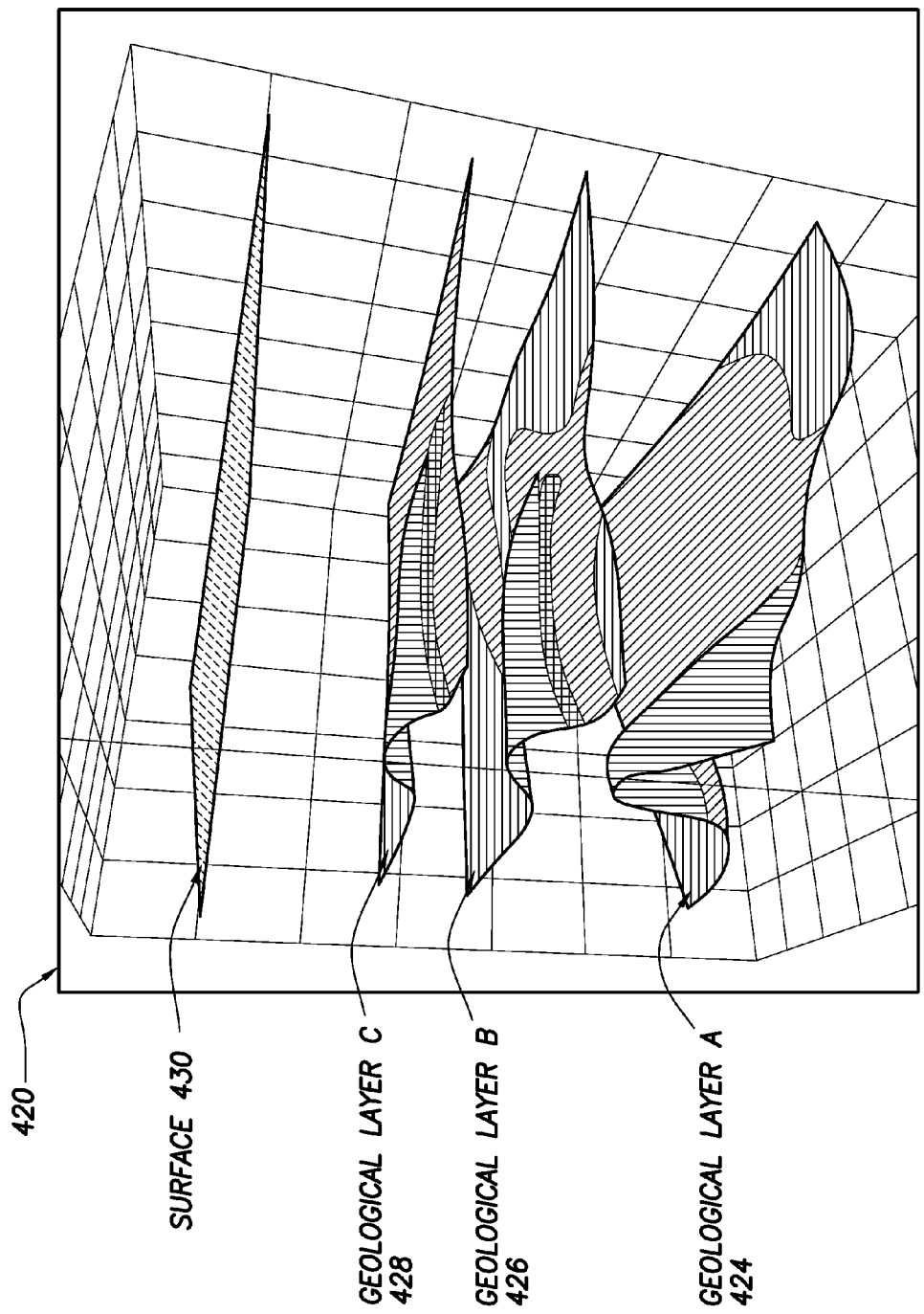
FIG.4.2

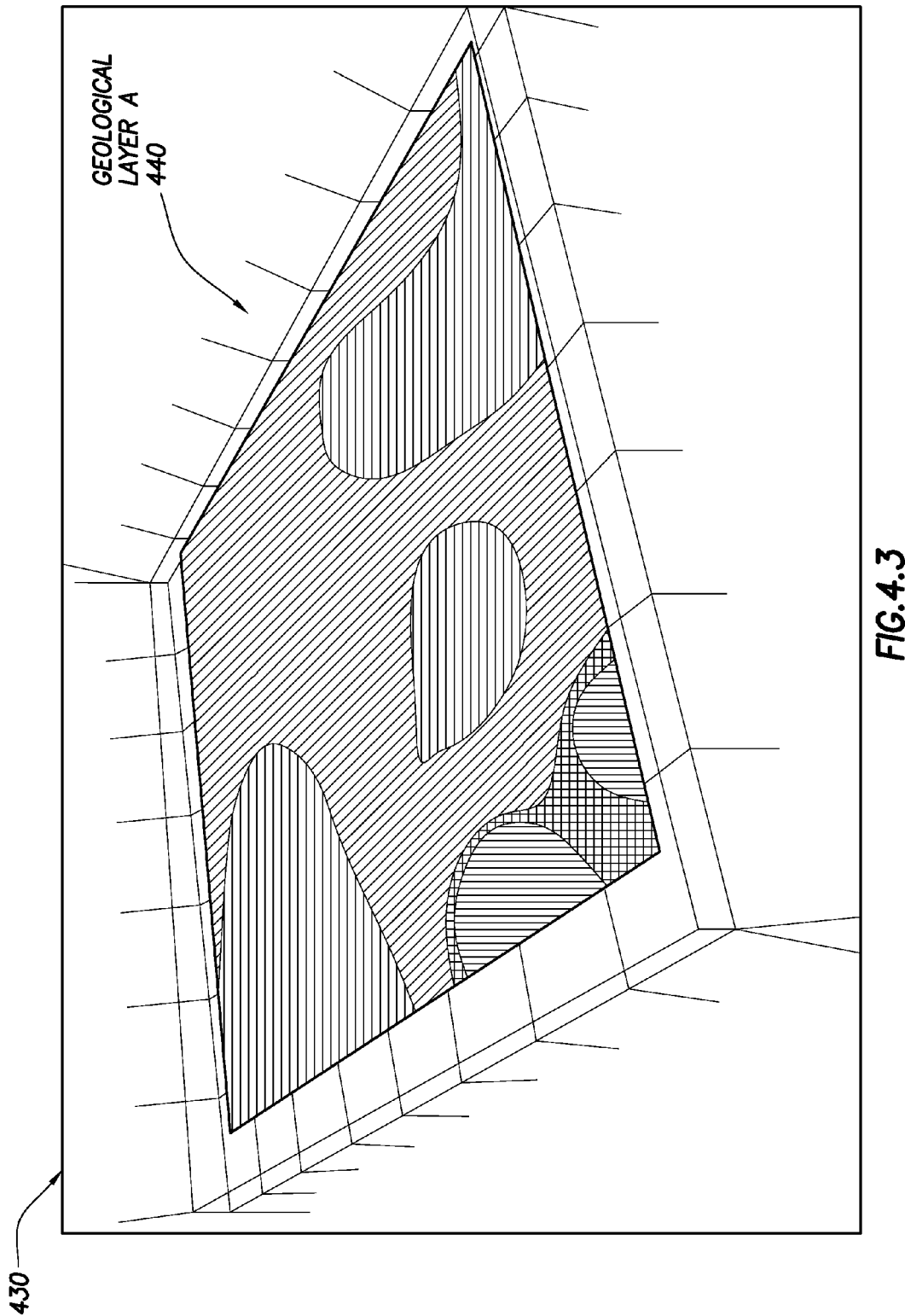
FIG.4.3

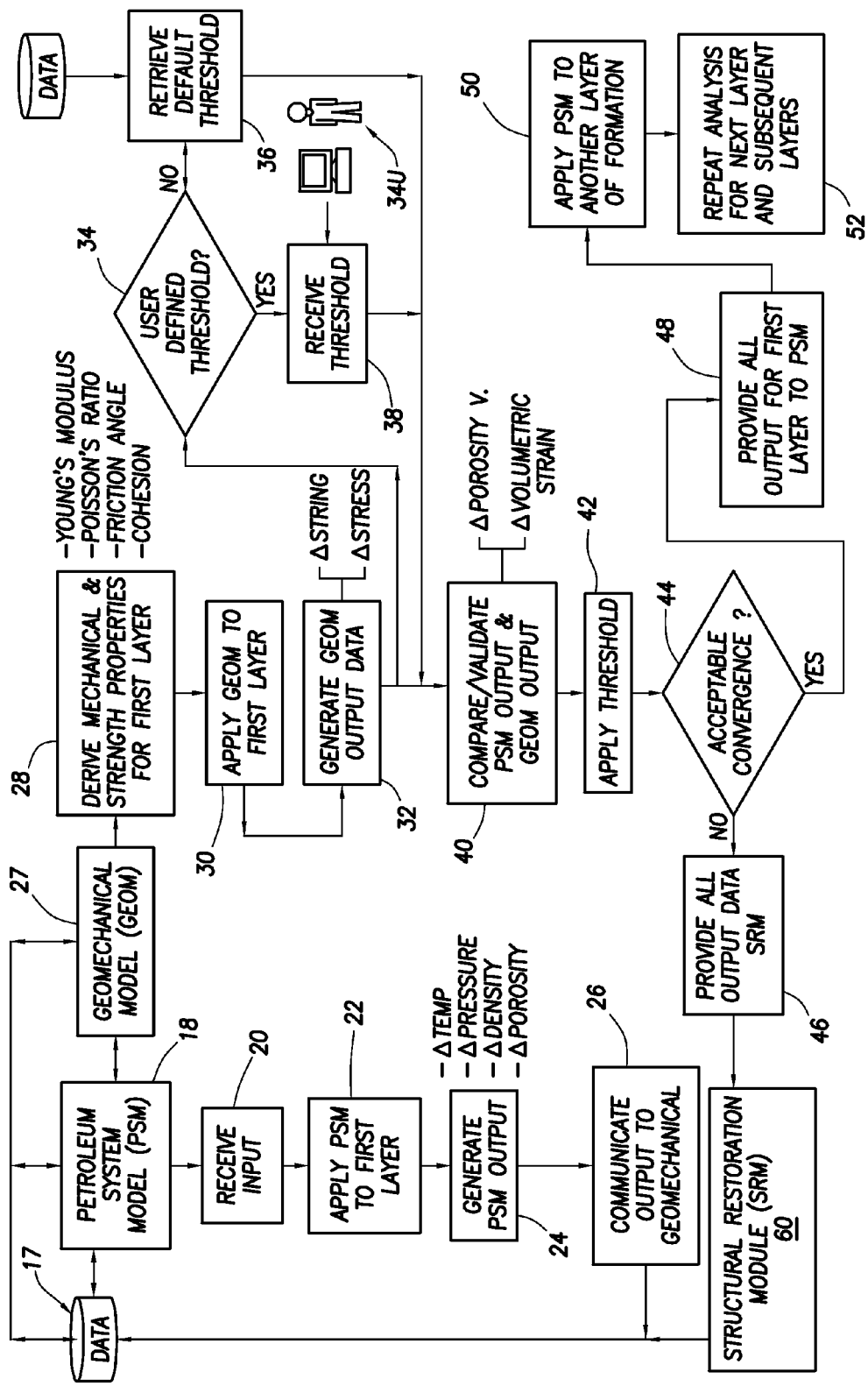
FIG.5.1

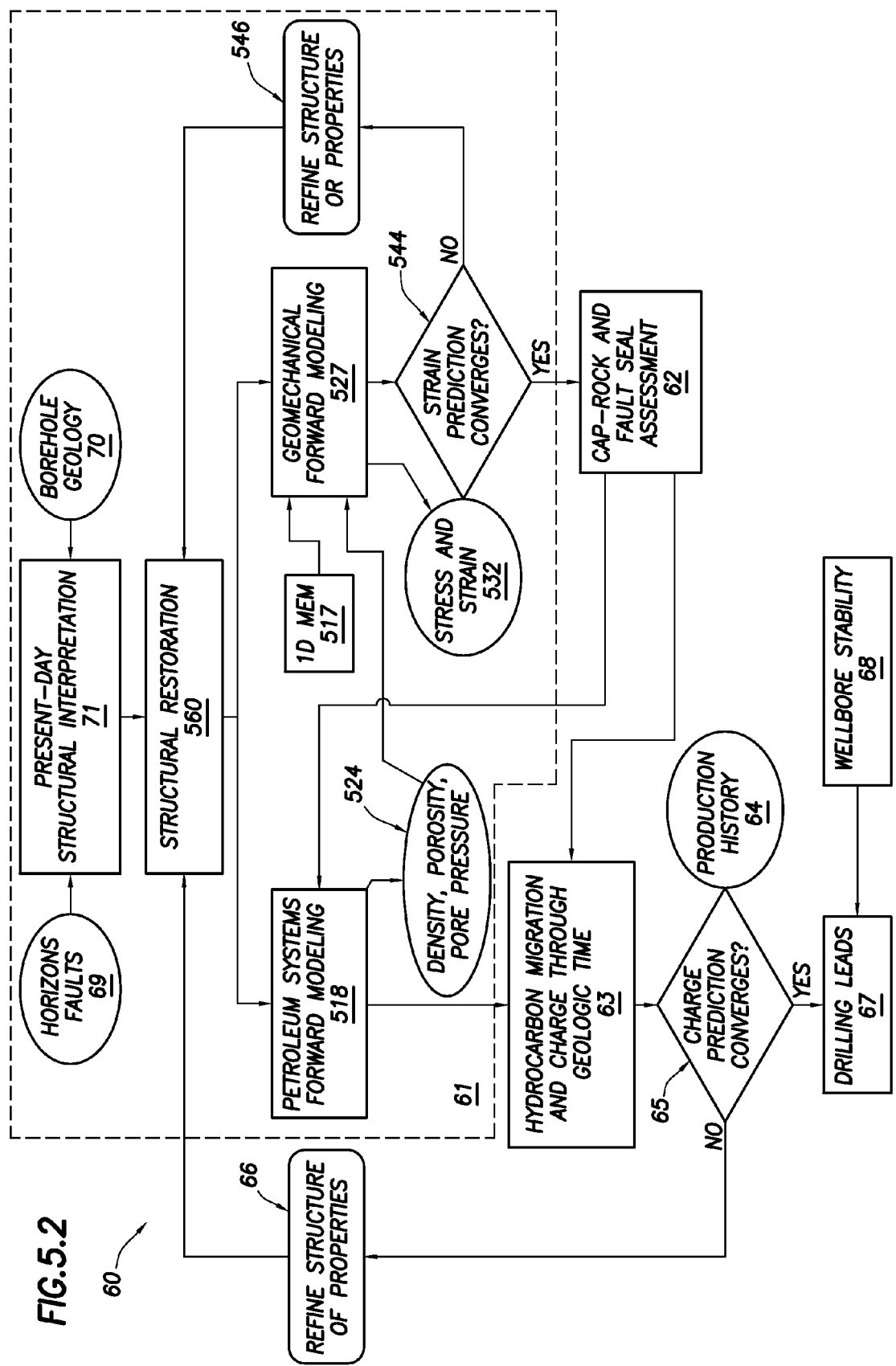
FIG. 5.2

MODEL-CONSISTENT STRUCTURAL RESTORATION FOR GEOMECHANICAL AND PETROLEUM SYSTEMS MODELING

CROSS REFERENCE TO RELATED APPLICATIONS

This application is related to co-pending U.S. patent application Ser. No. 12/693,813, filed on Jan. 26, 2010, and entitled "SYSTEM AND METHOD OF INTEGRATING SUBTERRANEAN COMPUTER MODELS FOR OIL AND GAS EXPLORATION", which is also assigned to the assignee of the present application, the subject matter of which is incorporated by reference herein.

This application is related to co-pending U.S. patent application Ser. No. 12/755,114, filed on Apr. 6, 2010, and entitled "DETERMINE FIELD FRACTURES USING GEOMECHANICAL FORWARD MODELING," which is also assigned to the assignee of the present application, the subject matter of which is incorporated by reference herein.

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids. Although the subterranean assets are not limited to hydrocarbon such as oil, throughout this document, the terms "oilfield" and "oilfield operation" may be used interchangeably with the terms "field" and "field operation" to refer to a field having any types of valuable fluids or minerals and field operations relating to any of such subterranean assets.

Petroleum system models can predict if, and how, a reservoir has been charged with hydrocarbons, including the source and timing of hydrocarbon generation, migration routes, quantities, and hydrocarbon type. Petroleum system models include the quantitative analysis and simulation of geological processes in sedimentary basins on a geological timescale. It further encompasses geometric development of the basin, heat and pore water flow modeling with regard to sediment compaction and basin subsidence or uplift, and the temperature-controlled chemistry of mineral and organic matter changes. Petroleum system models may be used to simulate processes related to the generation, migration, accumulation and loss of oil and gas, thereby leading to an improved understanding and predictability of their distribution and properties.

Geomechanics is the science of the way rocks compress, expand, and fracture. Over the geological timescale of a prospect or play, sediments are deposited, compacted, lithified, and deformed by tectonic events to produce layers of rocks with highly anisotropic and nonlinear mechanical characteristics. Where reservoirs exist, the fluids they contain, the reservoir rocks themselves, and the formations that surround them form intimately coupled systems.

Geomechanical models use calculated pressure, temperature, and saturation to calculate the behavior of the formation rock through geologic time. By relating rock stresses to reservoir properties, the geomechanical model enables the development of mechanical earth models that predict the geomechanical behavior of the formation during production and injection. The removal of hydrocarbons from a reservoir or the injection of fluids changes the rock stresses and geomechanics environment, potentially affecting compaction and subsidence, well and completion integrity, cap-rock and fault-seal integrity, fracture behavior, thermal recovery, and carbon dioxide disposal. Further, geomechanical models can provide faults stability and reactivation information throughout geological time, which is important for hydrocarbon migration and accumulation analysis.

SUMMARY

In general, in one aspect, the invention relates to a method for modeling a subterranean formation of a field. The method includes receiving a structural model of the subterranean formation, the structural model comprising a plurality of geological layers and material properties and geomechanical properties thereof, restoring, using the processor, each of the plurality of geological layers from the structural model to create a plurality of boundary conditions each associated with corresponding one of the plurality of geological layers, and iteratively modeling, using the processor, the each of the plurality of geological layers by applying a petroleum system model (PSM) to a first layer of the plurality of geological layers based on the material properties thereof and a first boundary condition of the plurality of boundary conditions corresponding to the first layer, the PSM generating a first set of output data comprising a change in the material properties pertaining to the first layer, communicating the first set of output data to a geomechanical model (GMM), applying the GMM to the first layer based on the geomechanical properties thereof, the first set of output data, and the first boundary condition, the GMM generating a second set of output data comprising a change in the geomechanical properties pertaining to the first layer, adjusting the plurality of boundary conditions based on a pre-determined criterion in response to the change in the material properties and the change in the geomechanical properties pertaining to the first layer exceeding a pre-determined tolerance, and iteratively applying the PSM and GMM to the first layer and iteratively adjusting the plurality of boundary conditions for the change in the material properties and the change in the geomechanical properties pertaining to the first layer to be within the pre-determined tolerance prior to applying the PSM and the GMM to a second layer of the plurality of geological layers.

Other aspects of model-consistent structural restoration for geomechanical and petroleum systems modeling will be apparent from the following description and the appended claims.

BRIEF DESCRIPTION OF DRAWINGS

The appended drawings illustrate several embodiments of model-consistent structural restoration for geomechanical and petroleum systems modeling and are not to be considered limiting of its scope, for model-consistent structural restoration for geomechanical and pertroleum systems modeling may admit to other equally effective embodiments.

FIGS. 4.1, 4.2, and 4.3 each show an example display screenshot for model-consistent structural restoration for geomechanical and pertroleum systems modeling in accordance with one or more embodiments.

FIGS. 5.1 and 5.2 each shows an example workflow for model-consistent structural restoration for geomechanical and pertroleum systems modeling in accordance with one or more embodiments.

DETAILED DESCRIPTION

Figure 1:
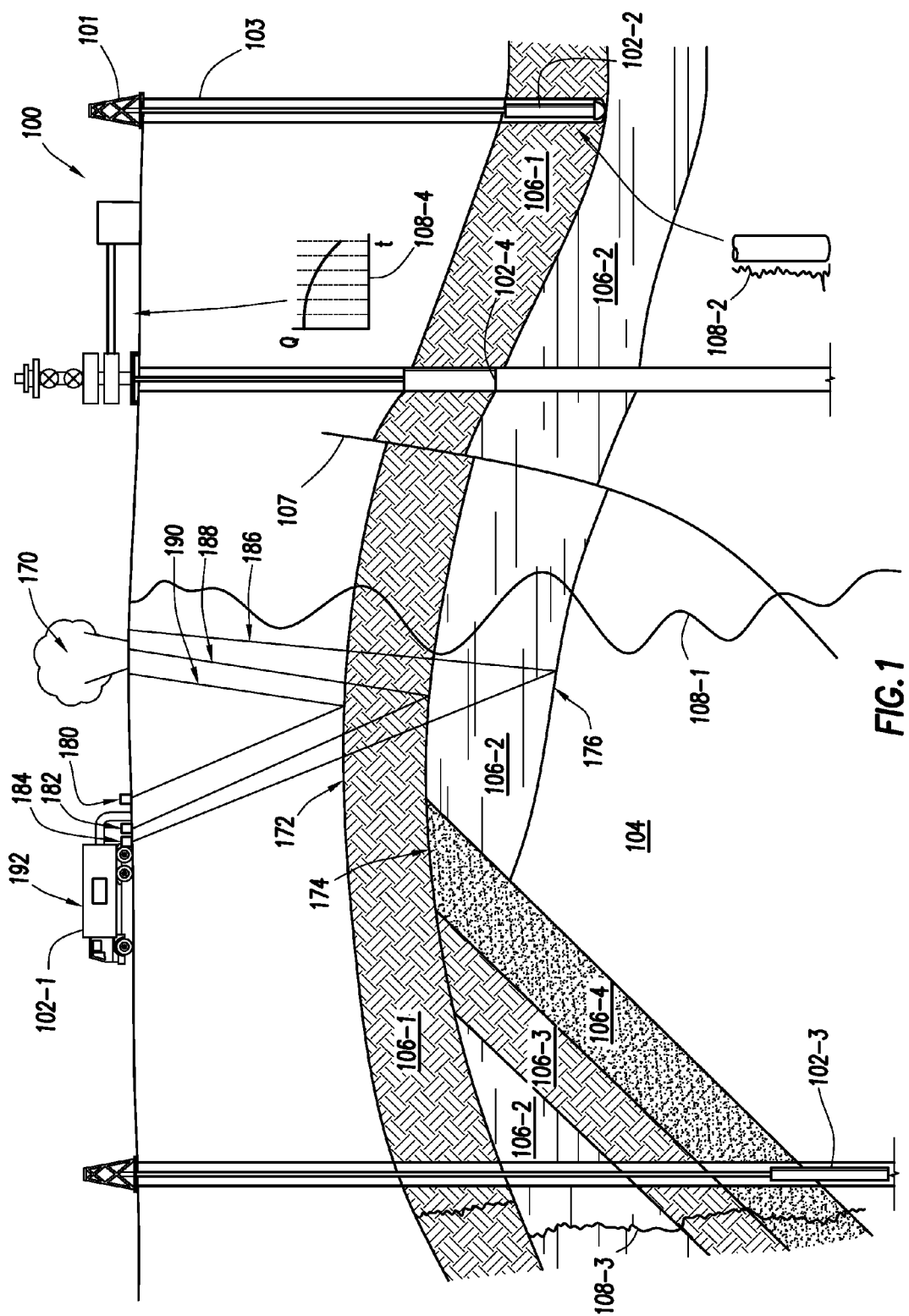
FIG. 1 is a schematic view, partially in cross-section, of a field having a plurality of data acquisition tools positioned at various locations along the field for collecting data from the subterranean formation, in which embodiments of model-consistent structural restoration for geomechanical and pertroleum systems modeling may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

In one or more embodiments of model-consistent structural restoration for geomechanical and pertroleum systems modeling, structural restoration and geomechanical modeling are integrated into petroleum systems modeling workflows, which enhance the interpretation and prediction of hydrocarbon charging, migration pathways analysis, and general geologic basin analysis for a field, by using the valid structural models generated from proper structural restoration as consistent input and by taking account of the fault and cap rock sealing factor through geological time as derived from geomechanical modeling. In particular, the petroleum system modeling is integrated with structural restoration using a decompaction algorithm, where effects of the faults are evaluated in a proper structural restoration. Specifically, the faults behavior plays an important role with regard to the trap integrity and hydrocarbon migration and accumulation, which are evaluated through geomechanical modeling of the field. Further, the method provides validation of paleo-geometries consistent with the present-day structural interpretation on the seismic volume, as well as validation of physically realizable paleo-deformation on seismic volume from geomechanical forward modeling. Accordingly, the seismically consistent horizon geometries are included in the local burial history (i.e., structural development through geologic time) and used in the petroleum systems modeling/geomechanical modeling operation of the field.

For clarification, a field may include part of a subterranean formation. More specifically, a field as referred to herein may include any underground geological formation containing a resource that may be extracted. Part, or all, of a field may be on land, water, and/or sea. Also, while a single field measured at a single location is described below, any combination of one or more fields, one or more processing facilities, and one or more wellsites may be utilized. The resource may include, but is not limited to, hydrocarbons (oil and/or gas), water, helium, and minerals. A field may include one or more reservoirs, which may each contain one or more resources.

FIG. 1 depicts a schematic view, partially in cross section of a field (100) having data acquisition tools (e.g., seismic truck (102-1), drilling tool (102-2), wireline tool (102-3), and production tool (102-4)) positioned at various locations in the field for gathering data of a subterranean formation (104). As shown, the data collected from the tools (102-1) through (102-4) can be used to generate data plots (108-1) through (108-4), respectively.

As shown in FIG. 1, the subterranean formation (104) includes several geological structures (106-1) through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, seismic truck (102-1) represents a survey tool that is adapted to measure properties of the subterranean formation. The survey operation is a seismic survey operation for producing sound vibrations. One such sound vibration (e.g., 186, 188, 190) generated by a source (170) reflects off a plurality of horizons (e.g., 172, 174, 176) in the subterranean formation (104). Each of the sound vibrations (e.g., 186, 188, 190) are received by one or more sensors (e.g., 180, 182, 184), such as geophone-receivers, situated on the earth's surface. The geophones produce electrical output signals, which may be transmitted, for example, as input data to a computer (192) on the seismic truck (102-1). Responsive to the input data, the computer (192) may generate a seismic data output.

As shown in FIG. 1, a drilling operation is depicted as being performed by drilling tools (102-2) suspended by a rig (101) and advanced into the subterranean formations (104) to form a wellbore (103). The drilling tools (106b) may be adapted for measuring downhole properties using logging-while-drilling ("LWD") tools.

A surface unit (now shown) is used to communicate with the drilling tools (102-2) and/or offsite operations. The surface unit is capable of communicating with the drilling tools (102-2) to send commands to the drilling tools (102-2), and to receive data therefrom. The surface unit may be provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed, and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data, or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/ or reservoir engineering. In this example, the reservoir, wellbore, surface and/or process data may be used to perform reservoir, wellbore, geological, geophysical, or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static and/or dynamic properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
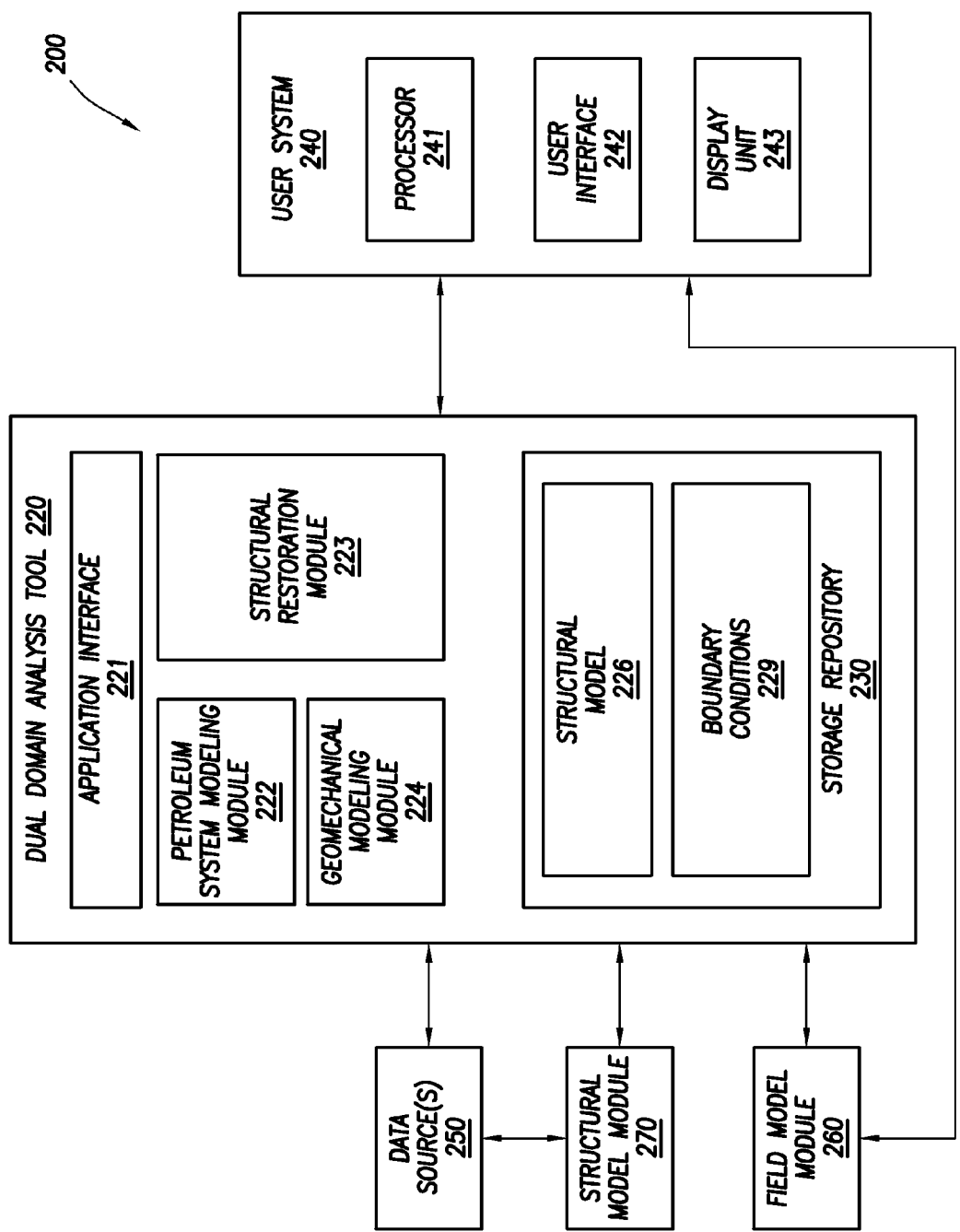
FIG. 2 shows a system in which one or more embodiments of model-consistent structural restoration for geomechanical and pertroleum systems modeling may be implemented.

FIG. 2 shows a diagram of a system (200) to perform model-consistent structural restoration for geomechanical and pertroleum systems modeling in accordance with one or more embodiments. The system (200) includes a dual domain analysis tool (220), a user system (240), one or more data sources (250), a structural model module (270), and field model module (260). The dual domain analysis tool (220) includes a storage repository (230), one or more application interfaces (221), a petroleum system modeling module (222), a structural restoration module (223), and a geomechanical modeling module (224). The user system (240) includes a processor (241), a user interface (242), and a display unit (243). Each of these components is described below. One of ordinary skill in the art will appreciate that embodiments are not limited to the configuration shown in FIG. 2).

In one or more embodiments, the dual domain analysis tool (220) is configured to interact with one or more data sources (250) using one or more of the application interface(s) (221). The application interface (221) may be configured to receive data (e.g., field data) from a data source (250) and/or store data to the storage repository (230). In addition, the application interface (221) may be configured to receive data from the storage repository (230) and deliver the data to a data source (250). The data source (250) may be one of a variety of sources providing data associated with a field. A data source (250) may include, but is not limited to, a surface unit for collecting data from the field, a computer, a database, a spreadsheet, a user, and a data acquisition tool as described above with respect to FIG. 1. A data source (250) may be configured to provide data to the application interface (221) through an automated process, such as through a web-based application, a direct feed, or some other form of automated process. Optionally, a data source (250) may require manual entry of data by a user through a user system (240) using the application interface (221).

In one or more embodiments, the dual domain analysis tool (220) is configured to interact with the structural model module (270) using one or more of the application interfaces (221). The application interface (221) may be configured to receive data (e.g., model output) from the structural model module (270) and/or store the data to the storage repository (230). In addition, the application interface (221) may be configured to receive data from the storage repository (230) and deliver the data to the structural model module (270). The structural model module (270) may use data, received from the dual domain analysis tool (220) and/or one or more data sources (250), to generate a structural model of a field. The structural model of the field produced by the structural model module (270) may be in two or three dimensions. In one or more embodiments, the structural model is used to mathematically model (e.g., using a simulation system) geological bodies within a subterranean formation. The structural model may describe the characteristics of the boundary layer between rock volumes with different properties or between solid earth and the atmosphere or the hydrosphere. The structural model may also describe the lithology of deposits, or may relate to surface morphology, age (as opposed to deposit age), or depositional environment. The surfaces in the structural model may represent boundaries of volumes. The output of a structural model may be used to understand a subterranean formation. The structural model module (270) may be a device internal to the dual domain analysis tool (220). Alternatively, the structural model module (270) may be an external device operatively connected to the dual domain analysis tool (220). The structural model module (270) may be configured to provide data to the application interface (221) through an automated process, such as through a web-based application, a direct feed, or some other form of automated process. Optionally, the structural model module (270) may require manual entry of data by a user through the user system (240) using the application interface (221).

In one or more embodiments, the dual domain analysis tool (220) is configured to interact with the field model module (260) using one or more of the application interfaces (221). The application interface (221) may be configured to receive data (e.g., model output) from the field model module (260) and/or store the data to the storage repository (230). In addition, the application interface (221) may be configured to receive data from the storage repository (230) and deliver the data to the field model module (260). The field model module (260) may use data, received from the dual domain analysis tool (220), to generate an operating plan for a field based on the output of the petroleum system modeling module (222), as described below. The field model module (260) may be a device internal to the dual domain analysis tool (220). Alternatively, the field model module (260) may be an external device operatively connected to the dual domain analysis tool (220). The field model module (260) may be configured to provide data to the application interface (221) through an automated process, such as through a web-based application, a direct feed, or some other form of automated process. Optionally, the field model module (260) may require manual entry of data by a user through the user system (240) using the application interface (221). The field model module (260) may also be configured to send data (e.g., model output) directly to the user system (240).

In one or more embodiments, the processor (i.e., central processing unit (CPU)) (241) of the user system (240) is configured to execute instructions to operate the components of the user system (240) (e.g., the user interface (242), and the display unit (243)).

In one or more embodiments, the user system (240) is configured to interact with a user using the user interface (242). The user interface (242) may be configured to receive data and/or instruction(s) from the user. The user interface (242) may also be configured to deliver instruction(s) to the user. In addition, the user interface (242) may be configured to send data and/or instruction(s) to, and receive data and/or instruction(s) from, the dual domain analysis tool (220) and/or the field model module (260). The user may include, but is not limited to, an individual, a group, an organization, or some other legal entity. The user system (240) may be, or may contain a form of, an internet-based communication device that is capable of communicating with the application interface (221) of the dual domain analysis tool (220). Alternatively, the dual domain analysis tool (220) may be part of the user system (240). The user system (240) may correspond to, but is not limited to, a desktop computer with internet access, a laptop computer with internet access, a smart phone, and a personal digital assistant (PDA), or other user accessible device.

In one or more embodiments, the user system (240) may include a display unit (243). The display unit (243) may be configured to display data for user visualization. For example, the data may include those stored in the storage repository (230).

As shown, communication links are provided between the dual domain analysis tool (220) and the user system (240), the data source(s) (250), the structural model module (270), and the field model module (260). A communication link is also provided between the data source(s) (250) and the structural model module (270), and between the user system (240) and the field model module (260). A variety of links may be provided to facilitate the flow of data through the system (200). For example, the communication links may provide for continuous, intermittent, one-way, two-way, and/or selective communication throughout the system (200). The communication links may be of any type, including but not limited to wired and wireless.

In one or more embodiments, a central processing unit (CPU, not shown) of the dual domain analysis tool (220) is configured to execute instructions to operate the components of the dual domain analysis tool (220) (e.g., storage repository (230), the application interface (221), the petroleum system modeling module (222), the structural restoration module (223), the geomechanical modeling module (224)). In one or more embodiments, the memory (not shown) of the dual domain analysis tool (220) is configured to store software instructions for simulating hydrocarbon charging, migration pathways analysis, and general geologic basin analysis for a field, by using the valid structural models generated from proper structural restoration as consistent input and by taking account of the fault and cap rock sealing factor through geological time as derived from geomechanical modeling. The memory may be one of a variety of memory devices, including but not limited to random access memory (RAM), read-only memory (ROM), cache memory, and flash memory. The memory may be further configured to serve as back-up storage for information stored in the storage repository (230).

In one or more embodiments, the dual domain analysis tool (220) is configured to obtain and store field data in the storage repository (230). In one or more embodiments, the storage repository (230) is a persistent storage device (or set of devices) and is configured to receive field data from a data source(s) (250), the structural model module (270), the field model module (260), and/or from a user system (240) using the application interface (221). The storage repository (230) is also configured to deliver field data to, and receive field data from, the petroleum system modeling module (222), the structural restoration module (223), and/or the geomechanical modeling module (224). The storage repository (230) may be a data store (e.g., a database, a file system, one or more data structures configured in a memory, an extensible markup language (XML) file, some other medium for storing data, or any suitable combination thereof), which may include information (e.g., historical data, user information, field location information) related to the collection of field data for a field. The storage repository (230) may be a device internal to the dual domain analysis tool (220). Alternatively, the storage repository (230) may be an external storage device operatively connected to the dual domain analysis tool (220).

In one or more embodiments, the dual domain analysis tool (220) is configured to interact with the user system (240) using the application interface (221). The application interface (221) may be configured to receive data and/or instruction(s) from the user system (240). The application interface (221) may also be configured to deliver instruction(s) to the user system (240). In addition, the application interface (221) may be configured to send data and/or instruction(s) to, and receive data and/or instruction(s) from, the storage repository (230), the petroleum system modeling module (222), the structural restoration module (223), and/or the geomechanical modeling module (224).

In one or more embodiments, the data transferred between the application interface (221) and the data source (250), the structural model module (270), the field model module (260), and/or the user system (240) corresponds to field data, fractures, stresses and strains, and/or various models of the field. In one or more embodiments, the dual domain analysis tool (220) is configured to support various data formats provided by the data source(s) (250), the structural model module (270), the field model module (260), and/or the user system (240).

In one or more embodiments, the dual domain analysis tool (220) is configured to perform a structural evolution analysis of a model of a field using the structural restoration module (223). The structural restoration module (223) may be configured to receive a model or data from the application interface (221) and iteratively restore each layer of the model. Specifically, the structural restoration module (223) may receive a structural model of the field (as generated by the structural model module (270)) from the application interface (221). The structural restoration module (223) may also be configured to receive any other model of the field, in two or three dimensions. The layers restored by the structural restoration module (223) may be geological layers, which may be differentiated by geologic age, formation type, or some other suitable differentiation of layers in the field. In one or more embodiments, the layers of greater geological age are located further away from the surface than layers of lesser geological age.

In one or more embodiments, the dual domain analysis tool (220) is configured to forward model the restored layers from the structural restoration module (223) using the geomechanical modeling module (224). The geomechanical modeling module (224) may be configured to use geomechanical properties to forward model the restored layers from the structural restoration module (223). In one or more embodiments, each layer of the field is forward modeled from the oldest in geological age to the newest in geological age. After each layer is forward modeled, the geomechanical modeling module (224) determines an incremental and accumulative stress and strain for that particular layer. In one or more embodiments, stresses, strains, and displacements are determined at the same time for all of the activated layers in the model during simulation. Specifically, the layer will be activated in a sequence from the old aged strata to younger aged strata, once the layer is deposited in the simulation, it is activated in the model.

Based on the incremental and accumulative stress and strain of a layer, one or more fractures are determined for that particular layer. As subsequent (i.e., more recent in geological time) layers are forward modeled, the incremental and accumulative stress(es) and strain(s) of each of the previously modeled (i.e., older) layers are reevaluated, based on each subsequent layer, to determine if the one or more fractures for that particular previous layer have changed. In one or more embodiments, the geomechanical modeling module (224) may evaluate all layers in the field or only a select number of layers in the field. The layers evaluated by the geomechanical modeling module (224) may be consecutive.

In one or more embodiments, the dual domain analysis tool (220) is configured to determine hydrocarbon migration and charge in a field using the petroleum system modeling module (222). The petroleum system modeling module (222) may be configured to conduct hydrocarbon migration and charge simulations based on the output of the structural restoration (223) and the geomechanical modeling module (224). Specifically, the petroleum system modeling module (222) may use the faults reactivation potential information and/or incremental and accumulative stress(es) and strain(s) data, as determined by the geomechanical modeling module (224), to predict the magnitude and other characteristics of the porosity in the formation. The output of the petroleum system modeling module (222) may be sent to the user system (240) and/or the field model module (260) to help generate a plan for a field operation.

The dual domain analysis tool (220) may include one or more system computers, which may be implemented as a server or any conventional computing system However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the dual domain analysis tool (220), it will be appreciated that a variety of components with various functions may be used to provide the formatting, processing, utility and coordination functions necessary to modify a magnified field model in the dual domain analysis tool (220). The components may have combined functionalities and may be implemented as software, hardware, firmware, or combinations thereof.

Figure 3:
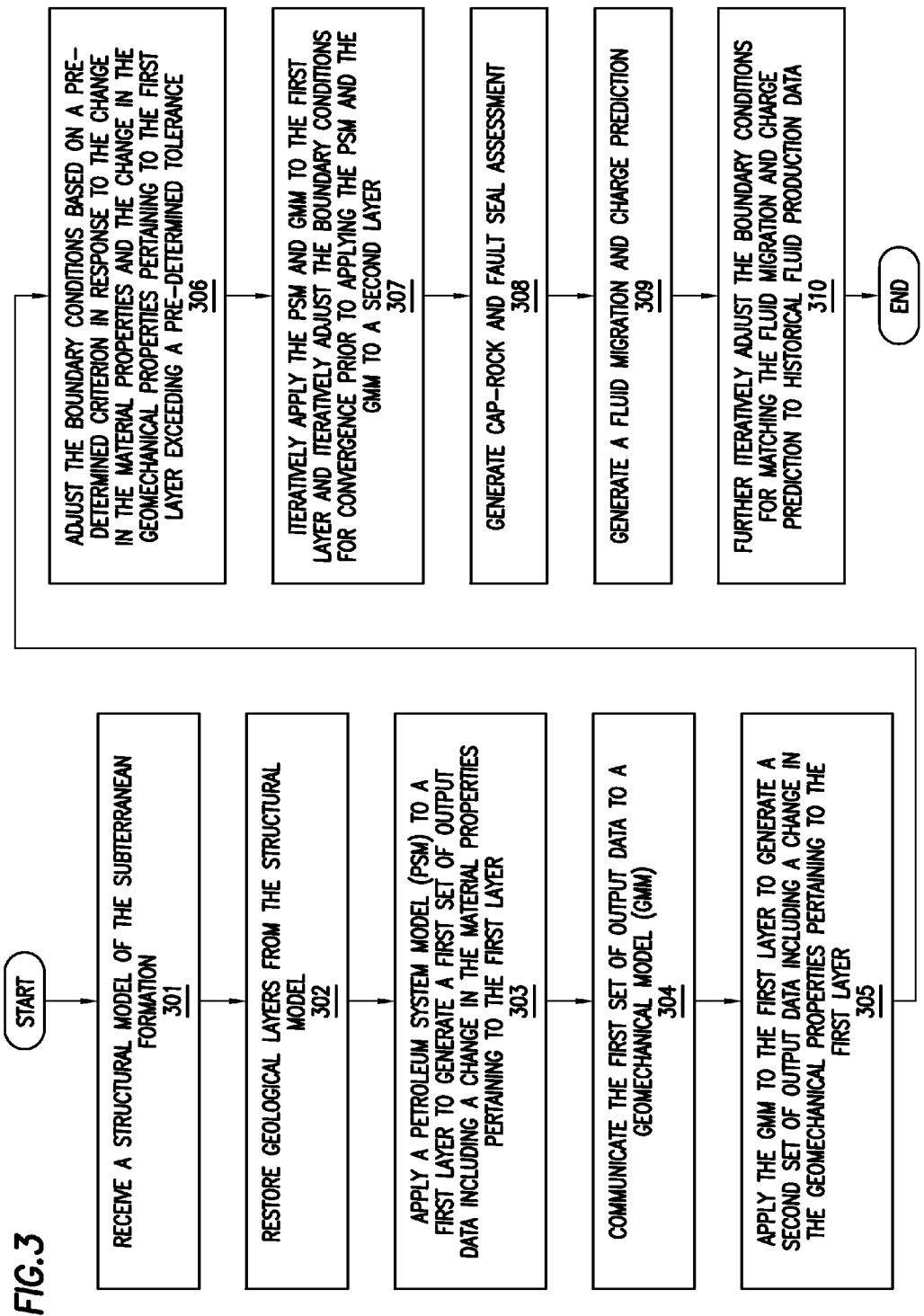
FIG. 3 shows an example method for model-consistent structural restoration for geomechanical and pertroleum systems modeling in accordance with one or more embodiments.

FIG. 3 shows an example method for model-consistent structural restoration for geomechanical and petroleum systems modeling in accordance with one or more embodiments. For example, the method shown in FIG. 3 may be practiced using the system (200) described in reference to FIG. 2 above for the field (100) described in reference to FIG. 1 above. In one or more embodiments of the invention, one or more of the elements shown in FIG. 3 may be omitted, repeated, and/or performed in a different order. Accordingly, embodiments of model-consistent structural restoration for geomechanical and petroleum systems modeling should not be considered limited to the specific arrangements of elements shown in FIG. 3.

Initially in Element (301), a structural model of the subterranean formation is received. In one or more embodiments, the structural model includes geological layers as well as material properties and geomechanical properties of the geological layers. For example, the material properties may include density, pore pressure, etc. while the geomechanical properties may include stresses, strains, etc. In some cases, the material properties and the geomechanical properties are obtained from a one dimensional mechanical earth model. Examples of the structural model are described in reference to FIGS. 4.1 to 4.3 below.

In Element (302), each of geological layers from the structural model is restored to create boundary conditions, where each boundary condition is associated with a corresponding geological layer. In one or more embodiments, a geological layer may be restored using techniques known to those skilled in the art. In one or more embodiments, the structural restoration techniques may be based on geometry based inclined shear, fault parallel flow, trishear algorithm, or geomechanics based linear elasticity theory. In one or more embodiments, a geological layer may be restored using structural restoration technique of (1) determining a layer mapping based on an effect of the deformations on the geological layer, (2) generating a restored layer by applying the layer mapping to the geological layer for removing the effect of the deformations on the geological layer, (3) determining a de-compaction mapping based on a compaction effect of the geological layer on a remaining portion of the seismic data corresponding to other geological layers beneath the geological layer, and (4) generating de-compacted seismic data by applying the de-compaction mapping to the remaining portion of the seismic data for removing the compaction effect caused by the geological layer. Generally, the geological layers are restored in order of geological time of the subterranean formation while the first layer corresponds to an oldest geologic time of the subterranean formation. Examples of restoring the geological layers are described in reference to FIGS. 4.1 to 4.3 below.

In Elements (303) through (307), each of the geological layers in the structural model is iteratively modeled as described below.

In Element (303), a petroleum system model (PSM) is applied to a first geological layer based on material properties and a first boundary condition corresponding to the first layer. Accordingly, the PSM generates a first set of output data including a change in the material properties pertaining to the first layer. The first set of output data is then communicated to a geomechanical model (GMM) in Element (304).

In Element (305), the GMM is applied to the first geological layer based on corresponding geomechanical properties, the first set of output data, and the first boundary condition. Accordingly, the GMM generates a second set of output data including a change in the geomechanical properties pertaining to the first layer.

In Element (306), the boundary conditions are adjusted based on a pre-determined criterion in response to the change in the material properties and the change in the geomechanical properties pertaining to the first layer exceeding a pre-determined tolerance. In one or more embodiments, the tolerance is determined based on failure criterion (e.g., in terms of failure values and/or failure Gaussian points number) of reservoir rocks in the subterranean formation. In one or more embodiments, a failure criterion for reservoir rock is determined based on the lithology of reservoir formations, the depth of reservoir, the present-day porosity, the strength of reservoir rock, such as Young's modulus, uniaxial compressive strength (UCS), tensile cut off, the potential depletion/injection level. Usually, reservoir rock failure can be defined by the Mohr-Coulomb criterion if reservoir rock is relatively strong and depletion level is relatively low. However, Chalk model or Critical Stat model may be used where reservoir rock is relatively weak, particularly with relatively high porosity and depletion level causing pore collapse to occur.

In Element (307), the PSM and GMM are iteratively applied to the first layer and the boundary conditions are iteratively adjusted for the change in the material properties and the change in the geomechanical properties pertaining to the first layer to be within the pre-determined tolerance prior to applying the PSM and the GMM to a second geological layer. In one or more embodiments, applying the PSM includes applying the second layer loading and boundary conditions as well as providing the stresses and strains tensor into the PSM. In particular, the second layer loading refers to gravity loading, the boundary conditions refer to the horizontal displacement for every activated layer, and vertical displacement of the basement (i.e., the oldest layer) related to structural events, which come from the structural restoration result.

In one or more embodiments, the structural restoration restores all geological layers before validating each of the restored layers using iterations of Elements (303) through (307).

In one or more embodiments, the structural restoration restores each geological layer one layer at a time while validating the restored layer using iterations of Elements (303) through (307) before beginning to restore the next deeper layer. Specifically, restoring the second geological layer is performed subsequent to iteratively applying the PSM and GMM to the first layer and iteratively adjusting the boundary conditions for the change in the material properties and the change in the geomechanical properties pertaining to the first layer to be within the pre-determined tolerance.

More details of iteratively modeling the geological layers are described in reference to FIGS. 5.1 and 5.2 below.

In Element (308), in response to completion of iteratively modeling of all geological layers, the GMM is used to generate cap-rock and fault seal assessment for communicating to the PSM. Accordingly, the PSM generates a fluid migration and charge prediction based on the cap-rock and fault seal assessment in Element (309).

In Element (310), the boundary conditions are further iteratively adjusted based on the pre-determined criterion in response to a mismatch of historical fluid production data from the fluid migration and charge prediction exceeding the pre-determined tolerance. Accordingly, the fluid migration and charge prediction are validated through iterations of Elements (303) through (310). Upon being validated, the fluid migration and charge prediction may be presented to a user for use in planning a field operation.

FIGS. 4.1, 4.2, and 4.3 each show an example display screenshot for model-consistent structural restoration for geomechanical and pertroleum systems modeling in accordance with one or more embodiments.

FIG. 4.1 shows an example screenshot (410) depicting a two dimensional representation of a subterranean formation, which may be the same as the subterranean formation (104) described in reference to FIG. 1 above. The subterranean formation, or subsurface underground, is composed of different layers (14) of subsurface material deposited, compacted, or otherwise tectonically deformed or displaced over periods of geological time. Each layer (14) represents the composition of the formation during a particular geologic time period. In this example, the youngest layer (14Y) is usually positioned closest to the surface (14S) of the subterranean formation (12), while the oldest layer (14O) is usually located at the bottom of the formation.

Geologic representations, such as that of FIG. 4.1, are generated using seismic data, well data, and other geologic knowledge collected with respect to each layer of the subterranean formation through geologic time, including the predicted location of oil and gas deposits (16). Such representations are utilized by various computer modeling programs used in the oil and gas industry.

FIG. 4.2 depicts screenshot (420) of an example structural model described in reference to FIGS. 2 and 3 above. As shown, a three-dimensional (3D) structural model of a subterranean formation (e.g., subterranean formation (104) described in reference to FIGS. 1 and 4.1 above) includes a number of geological layers. In one or more embodiments, the 3D structural model is a paleo-spastic model, which depicts a geological object at the time of deposition. For example, the structural model depicted in the screenshot (420) may have already been validated. In particular, the structural model may have been created and validated using field data collected from any number of sources described in reference to FIG. 1 above, as well as using the system and method described in reference to FIGS. 2 and 3 above and, optionally in combination with any of a number of software programs or other subterranean formation model technologies known in the art. The structural model in FIG. 4.1 shows three geological layers (i.e., geological layer A (424), geological layer B (426), geological layer C (428)) of the subterranean formation under the surface (430). Geological layer A (424), geological layer B (426), and geological layer C (428) may be consecutive geological layers in the subterranean formation. In addition, other geological layers, not shown in FIG. 4.1, may exist between geological layer A (424), geological layer B (426), and/or geological layer C (428).

As can be seen, geological layer A (424), geological layer B (426), and geological layer C (428) contain undulations designating relative elevation within each part of geological layers. Generally, such undulations represent faulting and/or folding effects of geological events, which may be combined with compaction effect due to gravity. In one or more embodiments, the extent of various undulations in geological layers are depicted by color coding, hatching, or some other way of designating relative elevation within each part of the geological layers. In this example in FIG. 4.1, the undulations within geological layer A (424), geological layer B (426), and geological layer C (428) are shown by hatching.

Geological layer A (424) is the oldest shown geological layer in the subterranean formation because geological layer A (424) is the furthest geological layer from the surface (430). Geological layer B (426) is the second oldest shown geological layer in the field because geological layer B (426) is the second furthest geological layer from the surface (430). Geological layer C (428) is the youngest shown geological layer in the field because geological layer C (428) is the closest geological layer to the surface (430). When restoring the geological layers from the structural model, the newest geological layer (i.e., geological layer C (428)) may be restored initially, followed by the next youngest geological layer (i.e., geological layer B (426)) and so on.

FIG. 4.3 depicts screenshot (420) of an example structurally restored domain described in reference to FIGS. 2 and 3 above. As shown, geological layer A (440) is a reconstruction (i.e., structurally restored version) of geological layer A (424) in FIG. 4.1 and the oldest geological layer in the subterranean formation. As can be seen, geological layer A (440) contains significantly fewer undulations compared to geological layer A (424) in FIG. 4.1 because the faulting and folding effects of the geological events and compaction effects of the geological layer B (426) and geological layer C (428) are largely removed by the restoration process. In this example in FIG. 4.2, the undulations within geological layer A (440) are shown by hatching.

In one or more embodiments, restoring the geological layers may include choosing an algorithm that corresponds to the structural regime of the subterranean formation, including but not limited to unfolding, unfaulting, and restoring eroded sections. In one or more embodiments, restoring the geological layers results in a series of structural models at different geological times throughout a geological history. The structural restoration of each geological layer may generate one or more boundary conditions to define the finite boundaries of the geological layer. Boundary conditions may include, but are not limited to, one or more depths, a set of coordinates, an area, a volume, some other definition of a subterranean area or space, or any suitable combination thereof. In one or more embodiments, structural restoration may be performed in conjunction with geomechanical forward modeling to validate the structural model and provide information regarding fault and fracturing characteristics in the subterranean formation. More details of structural restoration performed in conjunction with geomechanical forward modeling to provided validated structural model and fault and fracturing characteristics are described in copending U.S. patent application Ser. No. 12/755,114, filed on Apr. 6, 2010, and entitled "DETERMINE FIELD FRACTURES USING GEOMECHANICAL FORWARD MODELING", the subject matter of which is incorporated by reference herein.

FIGS. 5.1 and 5.2 each shows an example workflow for model-consistent structural restoration for geomechanical and pertroleum systems modeling in accordance with one or more embodiments.

Referring to FIG. 5.1, embodiments of model-consistent structural restoration for geomechanical and pertroleum systems modeling utilizes at least one petroleum system model, illustrated by Box (18). One example of a petroleum system model is PETROMOD™ software offered by Schlumberger Aachen Technology Center (AaTC), Ritterstraβe 23, 2072 Aachen, Germany (PETROMOD™ is a trademark of WESTERNGECO L.L.C. LTD LIAB CO DELAWARE located in Houston, Tex.). The petroleum system model is capable of analyzing geological and geophysical data relating to the petroleum potential of a subterranean formation. Upon receiving input data (17) relating to the subterranean formation, the petroleum system model assimilates available data concerning the subterranean formation and calculates horizon geometries together with changes in vertical stress, pressure, porosity, density, and temperature for the first layer of the formation, as illustrated by Boxes (20), (22), and (24). Input data may include any available data concerning the first layer of the formation including, but not limited to, seismic data, well data, geologic data, etc. In one or more embodiments of the invention, the input data may include at least a portion of output data generated from structural restoration, such as the example 3D structural model described in reference to FIGS. 4.2 and 4.3 above.

In one or more embodiments, the petroleum system model is first applied to the oldest layer (14O of FIG. 1) of the formation. In this example, the oldest layer of the formation is illustrated at the bottom of FIG. 4.1. Variables such as temperature, pressure, density and porosity, among others, are calculated by the petroleum system model for each layer of the formation. In one or more embodiments, the petroleum system model calculates the change in (represented by the symbol "Δ") vertical stress, pressure, porosity, density and temperature for each cell of the first layer of the formation.

Prior to analysis of the next layer of the subterranean formation, the petroleum system model communicates output data pertaining to its analysis of the first layer of the formation to a geomechanical model (27), as illustrated by Box (26). One example of a geomechanical model is VISAGE™ software offered by Schlumberger Reservoir Geomechanics Center of Excellence, 9/10 The Courtyard, Eastern Road, Bracknell, Berkshire, RG12 2XB, UK (VISAGE™ is a trademark of Schlumberger Technology Corporation, located in Houston, Tex.).

Output data communicated to the geomechanical model may include all of the output generated by the petroleum system model relating to the first layer of the formation, or only a portion thereof. Further, such data may be provided directly to the geomechanical model or through one or more storage devices accessible by the geomechanical and petroleum system model. Upon receipt of the output data from the petroleum system model, the geomechanical model derives mechanical and strength properties applicable to the first layer of the formation using at least a portion of the petroleum system model output data, as illustrated by Box (28).

Petroleum system models may be based on an assumption that the stress state in a basin is simple with simplified models for vertical and horizontal stresses, which are assumed to be principal stresses with the vertical stress being determined by the overburden weight. Assuming that the stress state is simple fails to account for the role of geomechanics in terms of how horizontal stresses can exert a major influence on basin processes.

In one or more embodiments, the mechanical properties derived by the geomechanical model include, but are not limited to, Young's Modulus and Poisson's Ratio, and strength properties include, but are not limited to, friction angle and cohesion. The derived mechanical and strength properties of the formation are used by the geomechanical model to calculate stress and strain variations associated with the first layer of the subterranean formation. In one or more embodiments, the geomechanical model may utilize uniaxial, triaxial, Brazilian and Scratch tests, as well as log data together with measured or computed Young's modulus and Poissons ratios, to compute stress and strain for each layer of the formation.

The geomechanical model utilizes the derived mechanical and strength properties to perform additional geomechanical calculations pertaining to the first layer of the formation, as illustrated by Box (30) of FIG. 5.1. In one or more embodiments, output data generated by the geomechanical model at this step includes stress and strain variation values for each cell of the formation of the first layer, as illustrated by Box (32). In one or more embodiments, the geomechanical model calculates the change in (represented by the symbol "Δ") stress and strain for each cell of the first layer of the formation.

In one or more embodiments, data generated by both models, i.e., petroleum system and geomechanical, are validated and cross-referenced for each layer of the formation. By cross-referencing results for each layer of the formation, improved reliability estimates of petroleum charge and mechanical seal integrity for geological features may be produced. In one or more embodiments, the validation process includes the use of one or more convergence thresholds. Convergence thresholds are used to increase the reliability and accuracy of computer simulation data relating to each layer of the formation.

If such threshold(s) are not met during analysis of a layer of the formation, the analysis of the layer at issue may be repeated until the desired convergence is reached. Such thresholds may be pre-programmed into the system or entered by one or more users (34U). In one or more embodiments, it is determined whether a user defined convergence threshold has been provided to the system, as illustrated by Box (34).

If no user defined threshold is provided, the present invention may retrieve "default" or pre-programmed threshold value(s) as illustrated by Box (36). If a user-defined threshold is available, the threshold is retrieved by the system, as illustrated by Box (38). Threshold values may take the form of any suitable value or variation and may be entered by the user or pre-programmed into the system. In one or more embodiments, a percentage variance (%) is utilized to determine if the desired convergence has been reached.

Once received, thresholds are applied and data from both models is cross referenced in order to validate the data with respect to the first layer of the formation prior to analysis of subsequent layers, as illustrated by Boxes (40) and (42). In one or more embodiments, the change in porosity values generated by the petroleum system model is compared to change in volumetric strain values generated by the geomechanical model in order to determine if the desired convergence has been achieved.

In this example, if the change in porosity values generated by the petroleum system model do not converge with the change in volumetric strain values generated by the geomechanical model within the desired threshold(s), the analysis of the layer is repeated until the desired convergence is reached, as illustrated by Boxes (44) and (46). In this example, the combined data generated by the petroleum system model and the geomechanical model is returned to the structural restoration module (described in reference to FIGS. 2 and 3 above) for use in re-analyzing and adjusting the first layer of the formation, as illustrated by Box (60). According, the adjustment is provided to PSM, as illustrated by Box (18) to initiate another iteration of the steps described above in an effort to improve convergence between the two models. More details of validating the structural model through structural restoration are described in reference to FIG. 5.2 below.

In one or more embodiments, the results of the validation process may be displayed to the user upon a display device, which readily informs the user of the validation, or lack thereof, and also allows the user to amend or revise the threshold(s) used by the system.

A maximum number of iterations for each layer, in the event of unacceptable convergence, may be pre-programmed into the system or entered into the system by the user. For example, the maximum number of iterations for the first layer of the formation may be set to four (4) iterations. In this example, if the desired convergence is not reached after four iterations, the system would proceed to analyze subsequent layers of the formation even though the desired convergence is not achieved.

It should be noted that more sophisticated standards may be implemented to improve or accelerate the convergence through iteration. For example, the iterative process of the present invention may be accelerated using Atkins accelerator programs.

When the desired convergence is reached, the combined data generated by the petroleum system model and the geomechanical model is returned to the petroleum system model, as illustrated by Box (48). The data is then used by the petroleum system model to analyze another layer of the formation, as illustrated by Box (50). The analysis and validation process described above is then repeated for the second layer of the formation and so on until all layers of the formation have been analyzed by the petroleum system and geomechanical model, as illustrated by Box (52).

FIG. 5.2 shows an application example (60) of the workflow described in reference to FIG. 5.1 above. A portion (61) of the application example (60) corresponds to the workflow depicted in FIG. 5.1. For example, boxes (560), (518), (524), (527), (532), (544), (546) depicted in FIG. 5.2 correspond to boxes (60), (18), (24), (27), (32), (44), (46) depicted in FIG. 5.1 above. In one or more embodiments, input data (17) of FIG. 5.1 may be obtained from restoration of most major structural events identified using the present-day structural interpretation (71) and validated via seismic (e.g., horizons/faults (69)) and borehole (e.g., borehole geology (70)) geologic correlation on reconstructed volume. In particular, validation of structural geometry considers that the amount of rock reserves before and after deformation if there is no erosion taking place while structural evolution analysis performed within structural restoration (560) may include restoring the faults, restoring the folding, restoring eroded section (if necessary), vertical formation decompaction of depositional units, and taking the isostasy into account (if necessary). Accordingly, information regarding the faulting and folding history may be provided to perform geomechanical forward modeling (527). Specifically, geomechanical forward modeling (527) is performed to provide the information on fault and fracturing characteristics according to the stresses and strains (532) generated by simulation at different stages of geological events, which in turn provide an indication regarding the validity of paleo-strueture and current structure.

In one or more embodiments, present-day structural interpretation (71) and structural restoration (560) may be completed for all layer in the region of interest (e.g., corresponding to data (17) of FIG. 5.1) before the petroleum systems forward modeling (518) and geomechanical forward modeling (527) are performed on layer by layer basis as described in reference to FIG. 5.1 above. While modeling each layer, iterative loops are executed in the workflow example (60) by refining (546) interpreted geological layer structure or modeled material/geomechanical properties to fine tune the geomechanical model (e.g., box (27) of FIG. 5.1) until the convergence of strain prediction and/or porosity prediction are within predetermined requirement.

In one or more embodiments, the structural restoration (560) restores and validates each layer by executing the iterative loops in the workflow example (60) to refine (546) interpreted geological layer structure or modeled material/geomechanical properties in the geomechanical model (e.g., box (27) of FIG. 5.1) before restoration of the next deeper layer begins. For example, while restoring each geological layer, box (546) may be iterated multiple times until the convergence of strain prediction and/or porosity prediction are within predetermined requirement.

In one or more embodiments, computation of stresses and strains is performed at different geological time and includes, for each geological time, assigning geomechanical properties to the geomechanical model, assigning pore pressure to the petroleum system model, applying boundary conditions, and calculating stresses and strains through time. Accordingly, geometries of the structural models through time are simulated based on the geomechanical properties, pore pressure, basement displacement and other boundary conditions. Further, probability of faults reactivation, sealing or opening may be assessed through geological time.

Upon completing the portion (61) for all layers in the application example (60), the valid structural models and information on faults characters (e.g., cap-rock and fault seal assessment (62)) are provided as input to petroleum system modeling for simulating charge/migration history, temperature, pressure, hydrocarbon volumes and properties, as illustrated by box (63). In one or more embodiments, simulation of migration and charge is performed based on boundary conditions of paleo-geometry, paleo-stress models, and available production history. For example, intermediate simulated migration and charge predictions are compared with production history (64) to evaluate charge prediction convergence. The boxes (61), (62), and (63) are iterated by refining (66) interpreted geological layer structure or modeled material/geomechanical properties until the charge prediction converges within a predetermined requirement. Through integrating the proper and consistent structure restoration into the geomechanical modeling and petroleum systems modeling workflows described above, the interpretation and prediction of hydrocarbon charging, migration pathways analysis are improved to reduce hydrocarbon drilling risks, as illustrated by boxes (67) and (68).

Figure 6:
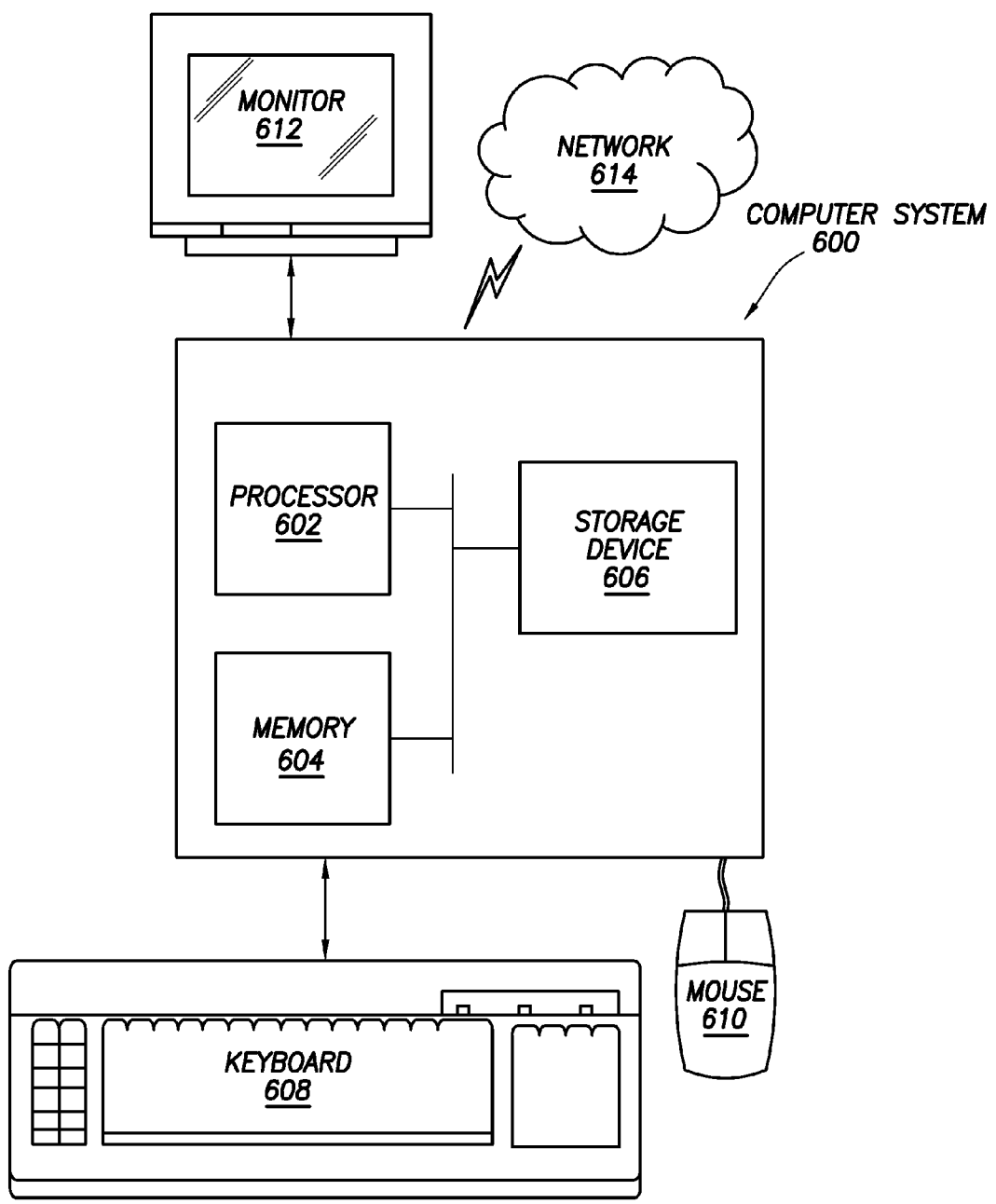
FIG. 6 shows a computer system in which one or more embodiments of model-consistent structural restoration for geomechanical and pertroleum systems modeling may be implemented.

Embodiments of model-consistent structural restoration for geomechanical and petroleum systems modeling may be implemented on virtually any type of computer regardless of the platform being used. For instance, as shown in FIG. 6, a computer system (600) includes one or more processor(s) (602) such as a central processing unit (CPU) or other hardware processor, associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display LCD, a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (600) includes at least the minimal processing, input, and/or output means necessary to practice one or more embodiments.

Further, those skilled in the art will appreciate that one or more elements of the aforementioned computer system (600) may be located at a remote location and connected to the other elements over a network. Further, one or more embodiments of the invention may be implemented on a distributed system having a plurality of nodes, where each portion of the implementation (e.g., the direction tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments of the invention may be stored on a non-transitory computer readable storage medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

While embodiments of the invention has been described with respect to a limited number of embodiments, those skilled in the art, having benefit of this disclosure, will appreciate that other embodiments may be devised which do not depart from the invention as disclosed herein. Accordingly, the scope of the invention should be limited only by the attached claims.

What is claimed is:

1. A method for modeling a subterranean formation of a field, comprising:
    receiving a structural model of the subterranean formation, the structural model comprising a plurality of geological layers and material properties and geomechanical properties thereof;
    restoring, using a processor, each of the plurality of geological layers from the structural model to create a plurality of boundary conditions each associated with corresponding one of the plurality of geological layers; and
    iteratively modeling, using the processor, the each of the plurality of geological layers by:
    applying a petroleum system model (PSM) to a first layer of the plurality of geological layers based on the material properties thereof and a first boundary condition of the plurality of boundary conditions corresponding to the first layer, the PSM generating a first set of output data comprising a change in the material properties pertaining to the first layer;
    communicating the first set of output data to a geomechanical model (GMM);
    applying the GMM to the first layer based on the geomechanical properties thereof, the first set of output data, and the first boundary condition, the GMM generating a second set of output data comprising a change in the geomechanical properties pertaining to the first layer;
    adjusting the plurality of boundary conditions based on a pre-determined criterion in response to the change in the material properties and the change in the geomechanical properties pertaining to the first layer exceeding a pre-determined tolerance; and
    iteratively applying the PSM and GMM to the first layer and iteratively adjusting the plurality of boundary conditions for the change in the material properties and the change in the geomechanical properties pertaining to the first layer to be within the pre-determined tolerance prior to applying the PSM and the GMM to a second layer of the plurality of geological layers.

2. The method of claim 1, wherein restoring the second layer of the plurality of geological layers is performed subsequent to iteratively applying the PSM and GMM to the first layer and iteratively adjusting the plurality of boundary conditions for the change in the material properties and the change in the geomechanical properties pertaining to the first layer to be within the pre-determined tolerance.

3. The method of claim 1, further comprising:
generating, using the GMM and in response to completing the iterative modeling of each of the plurality of geological layers, cap-rock and fault seal assessment for communicating to the PSM;
generating, using the PSM, a fluid migration and charge prediction based on the cap-rock and fault seal assessment;
further iteratively adjusting the plurality of boundary conditions based on the pre-determined criterion in response to a mismatch of historical fluid production data from the fluid migration and charge prediction exceeding the pre-determined tolerance; and
validating the fluid migration and charge prediction through iteration.

4. The method of claim 3, further comprising:
presenting, upon being validated, the fluid migration and charge prediction for use in planning a field operation.

5. The method of claim 1,
wherein the each of the plurality of geological layers is restored in order of geological time of the subterranean formation, and
wherein the first layer comprises an oldest geologic time of the subterranean formation.

6. The method of claim 1,
wherein the material properties comprises at least one selected from a group consisting of porosity, density, and pore pressure, and
wherein the geomechanical properties comprises at least one selected from a group consisting of stress and strain.

7. The method of claim 6, wherein the material properties and the geomechanical properties are obtained from a one dimensional mechanical earth model.

8. A system for modeling a subterranean formation of a field, comprising:
a structural model of the subterranean formation, comprising a plurality of geological layers and material properties and geomechanical properties thereof;
a structural restoration module executing on a processor and configured for restoring each of the plurality of geological layers from a structural model to create a plurality of boundary conditions each associated with corresponding one of the plurality of geological layers;
a petroleum system model (PSM), when applied to a first layer of the plurality of geological layers, comprising functionality to:
model the first layer based on the material properties thereof and a first boundary condition of the plurality of boundary conditions corresponding to the first layer; and
generate, in response to modeling thereof, a first set of output data comprising a change in the material properties pertaining to the first layer;
a geomechanical model (GMM), when applied to the first layer, comprising functionality to:
model the first layer based on the geomechanical properties thereof, the first set of output data, and the first boundary condition; and
generate, in response to modeling thereof, a second set of output data comprising a change in the geomechanical properties pertaining to the first layer;
memory storing instructions when executed by the processor comprising functionality to iteratively model each of the plurality of geological layers, by:
communicating the first set of output data to the GMM;
adjusting the plurality of boundary conditions based on a pre-determined criterion in response to the change in the material properties and the change in the geomechanical properties pertaining to the first layer exceeding a pre-determined tolerance; and
iteratively applying the PSM and GMM to the first layer and iteratively adjusting the plurality of boundary conditions for the change in the material properties and the change in the geomechanical properties pertaining to the first layer to be within the pre-determined tolerance prior to applying the PSM and the GMM to a second layer of the plurality of geological layers.

9. The system of claim 8, wherein restoring the second layer of the plurality of geological layers is performed subsequent to iteratively applying the PSM and GMM to the first layer and iteratively adjusting the plurality of boundary conditions for the change in the material properties and the change in the geomechanical properties pertaining to the first layer to be within the pre-determined tolerance.

10. The system of claim 8, the instructions when executed by the processor further comprising functionality to:
generate, using the GMM and in response to completing the iterative modeling of each of the plurality of geological layers, cap-rock and fault seal assessment for communicating to the PSM;
generate, using the PSM, a fluid migration and charge prediction based on the cap-rock and fault seal assessment;
further iteratively adjust the plurality of boundary conditions based on the pre-determined criterion in response to a mismatch of historical fluid production data from the fluid migration and charge prediction exceeding the pre-determined tolerance; and
validate the fluid migration and charge prediction through iteration.

11. The system of claim 10, the instructions when executed by the processor further comprising functionality to:
present, upon being validated, the fluid migration and charge prediction for use in planning a field operation.

12. The system of claim 8,
wherein the each of the plurality of geological layers is restored in order of geological time of the subterranean formation, and
wherein the first layer comprises an oldest geologic time of the subterranean formation.

13. The system of claim 8,
wherein the material properties comprises at least one selected from a group consisting of porosity, density, and pore pressure, and
wherein the geomechanical properties comprises at least one selected from a group consisting of stress and strain.

14. The system of claim 8, wherein material properties and the geomechanical properties are obtained from a 1D mechanical earth model.

15. A non-transitory computer readable storage medium storing instructions for modeling a subterranean formation of a field, the instructions when executed causing a processor to:
receive a structural model of the subterranean formation, the structural model comprising a plurality of geological layers and material properties and geomechanical properties thereof;

restore each of the plurality of geological layers from the structural model to create a plurality of boundary conditions each associated with corresponding one of the plurality of geological layers; and using a processor to iteratively model each of the plurality of geological layers by:

applying a petroleum system model (PSM) to a first layer of the plurality of geological layers based on the material properties thereof and a first boundary condition of the plurality of boundary conditions corresponding to the first layer, the PSM generating a first set of output data comprising a change in the material properties pertaining to the first layer;

communicating the first set of output data to a geomechanical model (GMM);

applying the GMM to the first layer based on the geomechanical properties thereof, the first set of output data, and the first boundary condition, the GMM generating a second set of output data comprising a change in the geomechanical properties pertaining to the first layer;

adjusting the plurality of boundary conditions based on a pre-determined criterion in response to the change in the material properties and the change in the geomechanical properties pertaining to the first layer exceeding a pre-determined tolerance; and iteratively applying the PSM and GMM to the first layer and iteratively adjusting the plurality of boundary conditions for the change in the material properties and the change in the geomechanical properties pertaining to the first layer to be within the pre-determined tolerance prior to applying the PSM and the GMM to a second layer of the plurality of geological layers.

16. The computer readable storage medium of claim 15, wherein restoring the second layer of the plurality of geological layers is performed subsequent to iteratively applying the PSM and GMM to the first layer and iteratively adjusting the plurality of boundary conditions for the change in the material properties and the change in the geomechanical properties pertaining to the first layer to be within the pre-determined tolerance.

17. The computer readable storage medium of claim 15, the instructions when executed further causing the processor to:

generate, using the GMM and in response to completing the iterative modeling of each of the plurality of geological layers, cap-rock and fault seal assessment for communicating to the PSM;

generate, using the PSM, a fluid migration and charge prediction based on the cap-rock and fault seal assessment;

further iteratively adjust the plurality of boundary conditions based on the pre-determined criterion in response to a mismatch of historical fluid production data from the fluid migration and charge prediction exceeding the pre-determined tolerance; and validate the fluid migration and charge prediction through iteration.

18. The computer readable storage medium of claim 17, the instructions when executed further causing the processor to:

present, upon being validated, the fluid migration and charge prediction for use in planning a field operation.

19. The computer readable storage medium of claim 15, wherein the each of the plurality of geological layers is restored in order of geological time of the subterranean formation, and wherein the first layer comprises an oldest geologic time of the subterranean formation.

20. The computer readable storage medium of claim 15, wherein the material properties comprises at least one selected from a group consisting of porosity, density, and pore pressure, and wherein the geomechanical properties comprises at least one selected from a group consisting of stress and strain.

* * * * *